Patented May 4, 1926.

1,583,761

UNITED STATES PATENT OFFICE.

LORIN B. SEBRELL, OF AKRON, OHIO, ASSIGNOR TO THE GOODYEAR TIRE & RUBBER COMPANY, OF AKRON, OHIO, A CORPORATION OF OHIO.

METHOD OF VULCANIZING CAOUTCHOUC AND PRODUCT PRODUCED THEREBY.

No Drawing.   Application filed February 9, 1924.   Serial No. 691,854.

*To all whom it may concern:*

Be it known that I, LORIN B. SEBRELL, a citizen of the United States, and resident of Akron, Ohio, have invented new and useful Improvements in Methods of Vulcanizing Caoutchouc and Products Produced Thereby, of which the following is a specification.

My invention relates to methods of vulcanizing rubber and rubber compounds, and it has, for its primary object, the provision of methods of vulcanization which shall insure products of high quality, especially adapted for the construction of various rubber articles, and in particular, pneumatic tire casings.

It is well-known, of course, that accelerators are very desirable in producing vulcanized rubber possessing suitable characteristics to adapt it for the manufacture of many rubber articles, of which pneumatic tire casings form an outstanding example. The accelerators are employed, not only as catalysts, but also to obtain certain desired physical properties in vulcanized rubber compounds, which will enhance their value in many applications. For example, some accelerators are especially desirable because they impart such physical characteristics to the vulcanized compound that it ages exceptionally well, which is a desirable quality when it is employed in a great many capacities, particularly in rubber tires. Other accelerators impart other outstanding characteristics, which it is especially desired to secure. It will be apparent, then, that although there are a number of accelerators now known to the art, nevertheless each has its desirable features, and may be especially selected with a view to producing a final product which is particularly adapted for a certain use.

The present invention is primarily concerned with the disclosure of a number of accelerators of such character as to insure a vulcanized rubber product that is susceptible of general application.

It has been found, from extensive experimentation, that thiodiazoles are desirable accelerators for general application. The accelerators may be broadly designated as compounds of pentacyclic formation, containing two carbon atoms, two nitrogen atoms and one sulfur atom, with a mercapto group joined to one of the carbon atoms. Certain of the compounds may be somewhat more specifically indicated by the following structural formula

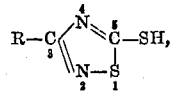

which is numbered in accordance with the more modern form of nomenclature. In the latter formula, if R is a phenyl group, the resulting compound is designated as 3-phenyl-5-mercapto-1-2-4-thiodiazol. As an example of how the latter compound may be embodied in a vulcanizing process, the following ingredients may be admixed in the proportions set forth.

|  | Parts. |
|---|---|
| Rubber | 50 |
| Zinc oxide | 2.5 |
| Sulphur | 3 |
| 3-phenyl-5-mercapto-1-2-4-thiodiazol | .50 |

A rubber product, having a relatively high tensile strength and other desirable characteristics, resulted from subjecting the above mixture to a temperature corresponding to 40 pounds of steam pressure, for 30 minutes. Lower sulfur ratios may be utilized without appreciably lengthening the time of cure. Moreover, zinc oxide or litharge may be embodied in the compound in which the above accelerator is employed, either of which will serve as an activator for the accelerator, and consequently increase its power to hasten the vulcanizing process. Such activators are preferably mixed with the accelerator to form a physical combination therewith. Metallic salts may also be employed to advantage with the accelerator as activators therefor, such salts being mixed with the accelerator in the same manner as the metallic oxides. Examples of such metallic salts are lead acetate, lead stearate, zinc acetate, zinc stearate, zinc benzoate or lead or zinc salts of other organic acids.

Metallic salts of 3-phenyl-5-mercapto-1-2-4-thiodiazol, such as zinc, lead, cadmium and mercury, also provide accelerators having considerable merit and a capacity for general application. However, the metallic salts do not appear to be as powerful as the non-metallic compound or physically combined with zinc oxide, litharge or the metallic salts.

A derivative of the above-mentioned accelerator is found in 3-para-tolyl-5-mercapto-1-2-4-thiodiazol, having the structural formula indicated as follows:

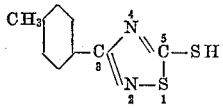

The metallic salts of this latter accelerator may also be utilized to advantage, and litharge, zinc oxide or the lead and zinc salts also serve as activators therefor.

Another accelerator, coming under the general classification above mentioned, is 2-5-dimercapto-1-3-4-thiodiazol, having the structural formula

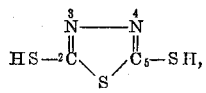

and indicated in Berichte, vol. 27, page 2519, as thiodiazoldisulfhydrat. As in the foregoing examples, the lead salt of this compound may be utilized. Also, litharge, zinc oxide or the metallic salts serve as activators therefor.

Another compound, falling under the broad classification, is 2-thio-5-mercapto-3-phenyl-1-3-4-thiodiazol, having the structural formula,

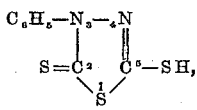

and indicated in Berichte, vol. 27, page 2511, as phenyl-dithio-biazolonthiol. A plurality of derivatives may be obtained from this latter compound, one of which is 2-methyl-2 hydro-3-phenyl-5-mercapto-1-3-4-thiodiazol, having the structural formula

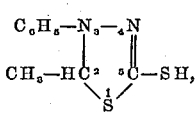

and indicated in Berichte, vol. 28, page 2641 (1895), as phenyl-methyl-thio-biazolin-sulfhydrat. Another derivative of the foregoing compound is 2-phenyl-2-hydro-3-phenyl-5-mercapto-1-3-4-thiodiazol, having the structural formula

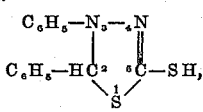

and indicated in Berichte, vol. 28, page 2643 (1895), as diphenyl-thio-biazol-sulfhydrat. As in the foregoing examples, the latter compounds may be utilized in the form of metallic salts of a bivalent metal, such as zinc, lead, mercury or cadmium. The activators may also be advantageously utilized therewith.

The foregoing specifically named compounds may all be employed to advantage in rubber mixes for general application, but it has been found that the compound 3-phenyl-5-mercapto-1-2-4-thiodiazol is probably the most powerful and desirable of the entire group named. However, the other compounds possess desirable characteristics, and may be found particularly advantageous for specific application. Examples might readily be given of rubber mixes incorporating each of the accelerators, but it is not believed necessary to an understanding of the invention, nor would such examples add materially to the disclosure thereof. Usually the amount of accelerator employed is in a proportion similar to the example given. The activators are also used in an amount corresponding to the quantity of zinc oxide set forth in the example.

Although I have specifically named a plurality of compounds, as representing a class of compounds contemplated by my invention, it is obvious that the claims should not be restricted thereby, inasmuch as other compounds coming within the general classification may be suggested thereby, and consequently, no limitations should be imposed upon the appended claims other than necessitated by the prior art.

What I claim is:

1. A method of vulcanizing caoutchouc that comprises admixing caoutchouc with a vulcanizing agent, incorporating in the mixture a compound of pentacyclic formation embodying two C atoms, two N atoms, one S atom and having a mercapto group joined to one of the C atoms, mixing a metallic oxide therewith and applying heat.

2. A method of vulcanizing caoutchouc that comprises admixing caoutchouc with a vulcanizing agent, incorporating in the mixture a compound of pentacyclic formation embodying two C atoms, two N atoms, one S atom and having a mercapto group joined to one of the C atoms, mixing a metallic salt therewith and applying heat.

3. A method of vulcanizing caoutchouc that comprises admixing caoutchouc with a vulcanizing agent, incorporating in the mix a compound having the general formula

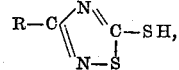

adding a metallic oxide thereto and applying heat.

4. A method of vulcanizing caoutchouc that comprises admixing caoutchouc with a vulcanizing agent, incorporating in the mix a compound having the general formula

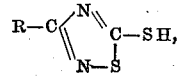

adding a metallic salt thereto and applying heat.

5. A method of vulcanizing caoutchouc that comprises admixing caoutchouc with a vulcanizing agent, mixing 3-phenyl-5-mercapto-1-2-4-thiodiazol therewith, adding an activator thereto, and subjecting the mixture to heat.

6. A method of vulcanizing caoutchouc that comprises admixing caoutchouc with a vulcanizing agent, incorporating in the mix a metallic salt of a compound having the general formula

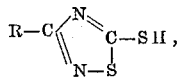

adding an activator thereto and applying heat.

7. A method of vulcanizing caoutchouc that comprises admixing caoutchouc with a vulcanizing agent, incorporating in the mix a salt formed by a reaction between a compound having the general formula

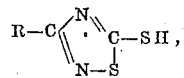

and a salt of a bivalent metal, adding an activator thereto and applying heat.

8. A method of vulcanizing caoutchouc that comprises admixing caoutchouc with a vulcanizing agent, incorporating in the mix a lead salt of a compound having the general formula

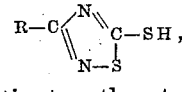

adding an activator thereto and applying heat.

9. A method of vulcanizing caoutchouc that comprises admixing caoutchouc with a vulcanizing agent, mixing a metallic salt of 3-phenyl-5-mercapto-1-2-4-thiodiazol therewith, adding an activator thereto and subjecting the mixture to heat.

10. A method of vulcanizing caoutchouc that comprises admixing caoutchouc with a vulcanizing agent, mixing therewith a salt formed by a reaction between 3-phenyl-5-mercapto-1-2-4-thiodiazol and a salt of a bivalent metal, adding an activator thereto and subjecting the mixture to heat.

11. A method of vulcanizing caoutchouc that comprises admixing caoutchouc with a vulcanizing agent, incorporating in the mix a compound having the general formula

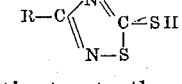

adding an activator to the mixture and applying heat thereto.

12. A method of accelerating the vulcanization of caoutchouc that comprises vulcanizing the same in the presence of a thiodiazol.

13. A method of accelerating the vulcanization of caoutchouc that comprises vulcanizing the same in the presence of a thiodiazol or derivative thereof having a mercapto group joined to a carbon atom of the thiodiazol.

14. A method of accelerating the vulcanization of caoutchouc that comprises vulcanizing the same in the presence of a thiodiazol, having an aryl group joined to its cyclic structure.

15. A method of accelerating the vulcanization of caoutchouc that comprises vulcanizing the same in the presence of a thiodiazol, having a mercapto and aryl group joined to its cyclic structure.

16. A method of accelerating the vulcanization of caoutchouc that comprises vulcanizing the same in the presence of a metallic derivative of a thiodiazol.

17. A vulcanized caoutchouc product formed by the reaction of caoutchouc, a vulcanizing agent, an activator, and a compound having the general formula

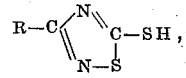

18. A vulcanized caoutchouc product formed by the reaction of caoutchouc, a vulcanizing agent, a metallic oxide, and a compound of pentacyclic formation embodying two C atoms, two N atoms, one S atom, and having a mercapto group joined to one of the C atoms.

19. A vulcanized caoutchouc product formed by the reaction of caoutchouc, a vulcanizing agent, a metallic salt, and a compound of pentacyclic formation embodying two C atoms, two N atoms, one S atom, and having a mercapto group joined to one of the C atoms.

20. A vulcanized caoutchouc product formed by the reaction of caoutchouc, a vulcanizing agent, an activator, and 3-phenyl-5-mercapto-1-2-4-thiodiazol.

21. A vulcanized caoutchouc product formed by the reaction of caoutchouc, a vulcanizing agent, an activator and a salt formed by a reaction between 3-phenyl-5-mercapto-1-2-4-thiodiazol and a salt of a bivalent metal.

In witness whereof, I have hereunto signed my name.

LORIN B. SEBRELL.